US010163310B2

(12) United States Patent
Kulkarni et al.

(10) Patent No.: US 10,163,310 B2
(45) Date of Patent: Dec. 25, 2018

(54) ALARM PANEL

(71) Applicant: Tyco Fire & Security GmbH, Neuhausen am Rheinfall (CH)

(72) Inventors: Prasad Kulkarni, Winnersh (GB); Josef Prokop, Vysoke Popovice (CZ)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/037,085

(22) PCT Filed: Nov. 17, 2014

(86) PCT No.: PCT/GB2014/053396
§ 371 (c)(1),
(2) Date: May 17, 2016

(87) PCT Pub. No.: WO2015/071692
PCT Pub. Date: May 21, 2015

(65) Prior Publication Data
US 2016/0300460 A1    Oct. 13, 2016

(30) Foreign Application Priority Data

Nov. 18, 2013    (GB) .................................. 1320344.3

(51) Int. Cl.
*G06F 3/041*    (2006.01)
*G06F 3/045*    (2006.01)
(Continued)

(52) U.S. Cl.
CPC ............. *G08B 5/36* (2013.01); *G06F 3/0412* (2013.01); *G06F 3/04842* (2013.01);
(Continued)

(58) Field of Classification Search
CPC ............ H05B 37/0227; H05B 37/0272; H05B 33/0854
See application file for complete search history.

(56) References Cited

U.S. PATENT DOCUMENTS 3,623,087 A * 11/1971 Gallichotte ............ G08B 25/14
340/509
4,728,936 A    3/1988 Guscott et al.
(Continued)

FOREIGN PATENT DOCUMENTS

CA    2041986 A1    11/1992
JP    S6461897 A    3/1989
(Continued)

OTHER PUBLICATIONS

Great Britain IP Office Combined Search and Examination Report, dated May 8, 2014, for Great Britain Patent Application No. GB1320344.3, filed Nov. 18, 2013. Six pages.
(Continued)

*Primary Examiner* — Nan-Ying Yang
(74) *Attorney, Agent, or Firm* — HoustonHogle LLP (57) ABSTRACT

A fire alarm panel comprises a panel interface. The panel interface includes a display screen, a plurality of discrete condition lights separate from the display screen, and a touchscreen panel extending across both the display screen and the plurality of condition lights.

18 Claims, 6 Drawing Sheets

(51) Int. Cl.
    *G08B 5/36*     (2006.01)
    *G08B 25/14*     (2006.01)
    *G06F 3/0488*     (2013.01)
    *G06F 3/0484*     (2013.01)
    *G08B 17/06*     (2006.01)

(52) U.S. Cl.
    CPC ......... *G06F 3/04886* (2013.01); *G08B 17/06* (2013.01); *G08B 25/14* (2013.01)

(56) References Cited

U.S. PATENT DOCUMENTS

| | | | |
|---|---|---|---|
| 5,297,252 A * | 3/1994 | Becker | G08B 25/14 340/506 |
| 2003/0050713 A1 | 3/2003 | Piersanti et al. | |
| 2003/0097188 A1 * | 5/2003 | O'Mahoney | G05B 19/042 700/17 |
| 2004/0174256 A1 | 9/2004 | Hershkovitz et al. | |
| 2012/0194336 A1 * | 8/2012 | Thiruvengada | G08B 13/19645 340/525 |
| 2014/0320441 A1 | 10/2014 | Yamada et al. | |

FOREIGN PATENT DOCUMENTS

| | | |
|---|---|---|
| WO | 2009106887 A1 | 9/2009 |
| WO | 2013081112 A1 | 6/2013 |

OTHER PUBLICATIONS

Great Britain IP Office Examination Report, dated Jul. 15, 2016, for Great Britain Patent Application No. GB1320344.3, filed Nov. 18, 2013. Four pages.

Great Britain IP Office Search Report, dated Jul. 15, 2016, for Great Britain Patent Application No. GB1320344.3, filed Nov. 18, 2013. Two pages.

International Search Report and Written Opinion of the International Searching Authority, dated Mar. 20, 2015 from International Application No. PCT/GB2014/053396, filed on Nov. 17, 2014. Seventeen pages.

ZFP Touchscreen-Controlled Analogue Addressable Fire Panel, C-TEC, Retrieved from www.c-tec.co.uk, ZFP_16_page_Brochure_Rev1.pdf (Jan. 15, 2013).

International Preliminary Report on Patentability, dated May 24, 2016, from International Application No. PCT/GB2014/053396, filed on Nov. 17, 2014. Twelve pages.

* cited by examiner

ALARM PANEL

RELATED APPLICATIONS

This application is a § 371 National Phase Application of International
Application No. PCT/GB2014/053396, filed on Nov. 17, 2014, which claims priority to GB Application No 1320344.3, filed on Nov. 18, 2013, both of which are incorporated herein by reference in their entirety.

The present invention relates to fire alarm panels, generally known in Europe as control and indicating equipment (CIE), a part of fire detection systems.

Fire alarm panels often include a small text display screen for displaying text which indicates the condition of a fire detection system, buttons for operating the fire alarm panel and an array of LED's, each LED corresponding to the condition of a different part of the fire detection system. The use of LEDs and what they represent is mandated by legislation in many countries. For example, looking at one known fire alarm panel, there is an LED associated with each of the following:

General: fire; fault; disabled; and test,
Panel: activated; mains fault; system fault; and day mode,
Sounders: activated; fault; and disabled,
Signaling: activated; fault; and disabled,
Protection: activated; fault; and disabled.

The use of LEDs in fire alarm panels is mandated in many countries since LEDs offer a robust and reliable way of displaying the condition of the system, drawing an operator's eye directly to that LED. The operator, seeing the illumination of an LED, is immediately able to tell that they need to investigate a particular part of the fire detection system further. An illuminated LED might indicate, for example, that there is a fault within a component or within a loop of components, that a fire is detected, that part of the system is disabled, or any of a number of other conditions. If the operator wishes to obtain more information concerning the indicated condition, he is able to look it up by making appropriate entries using the buttons and display screen. For example, if an LED is illuminated associated with "Sounders: Fault," the operator uses the buttons to navigate through a series of menus and sub-menus taking him to "Sounders," and then to information on sounders where there is a fault indicated. He can then take the necessary action.

Normally the display screens are small since individual characters of text are small and because larger display screens are relatively expensive or require more power to be supplied to them. Commonly, display screens are currently about 5.7 inches, although smaller screens of 4.3 inches and 3.3 inches are commonly used.

While existing fire alarm panels are effective, navigating through the menus can be cumbersome and time consuming. In the event of a fire condition being indicated by a corresponding LED, it is important for an operator to be able to gather information concerning the nature of the fire condition urgently, particularly where the fire control panel can identify the location of any fire.

According to a first aspect of the present invention, a fire alarm panel comprises: a panel interface, the panel interface including: a display screen; a plurality of discrete condition lights separate from the display screen; and a touchscreen panel extending across both the display screen and the plurality of condition lights. Such a fire alarm panel has the notable advantage that a user can touch the touchscreen panel at the position of one of the discrete condition lights and information relating to the condition for that discrete condition light is placed on the display screen. For example, a region of the touchscreen panel corresponding to the position of a discrete condition light constitutes a button on the touch screen panel which causes the panel interface to change the display screen to display information about the component that has caused the discrete condition light to be illuminated.

Preferably, the touchscreen panel is arranged to form a layer over both the display screen and the condition lights.

In the preferred embodiment, the panel interface further includes fixed icons separate from the display screen and separate from the condition lights but within the extent of the touchscreen panel. In this way, various functions and operations can be selected, particularly those which can be selected at any time.

According to a preferred embodiment, the panel interface further comprises a user interface processor having a display signal output for directing a display signal to the display screen, and the display screen includes a display signal input for receiving the display signal from the user interface processor. In this way, the user interface processor is able to control what is displayed on the display screen.

Advantageously, the touchscreen panel includes a selection signal output for outputting a signal indicative of touches detected on the touchscreen panel and the user interface processor includes a selection signal input for receiving the selection signal from the touchscreen panel. In this way, selections made by an operator can be interpreted so as to be used by the user interface processor for control of the user interface.

It is also advantageous for the panel interface to further include a storage unit, the storage unit being connected to the user interface processor. The storage unit can store, for example, images for display on the display screen, configuration information, a library of maps of the premises being protected or a library of images for display by the display screen.

According to the preferred embodiment, the user interface processor includes a condition signal output and the plurality of discrete condition lights includes a condition signal input connected to the condition signal output. A condition signal is conveyed from the condition signal output to the condition signal input for controlling the plurality of discrete condition lights.

According to a second aspect of the present invention, a method of operating a fire panel of the first aspect of the invention comprises the steps of: responding to the touching of the touchscreen panel in the region of a condition light by displaying a display image on the display screen relating to the condition of the condition light.

According to one embodiment, the method further comprises the step of retrieving a map image and the step of displaying a display image includes displaying the map image on the display screen.

According to another embodiment, the method further comprises the step of retrieving a template image and the step of displaying a display image includes displaying the template image on the display screen.

According to a third aspect of the present invention, a fire alarm panel of a fire detection system arranged to protect a plurality of protected zones of a premises comprises: a graphical display screen; a plurality of discrete condition lights which represent the protected zones, a manual selection input associated with each of the discrete condition lights; a user interface processor; and a storage unit containing image data, wherein the user interface processor includes an input for receiving a signal from each of the manual selection inputs and a display output arranged to present the image data on the graphical display as a map of the protected premises showing the location of the zone associated with the manually selected input. In this way, with a single manual selection, the graphical display screen displays a map showing where a condition, such as a fire, is present. This can reduce the time it takes to direct firemen and rescue workers to the actual location of a fire, or maintenance workers to the location of a fault.

The present invention will now be described by way of example only with reference to the drawings in which.

Figure 1:
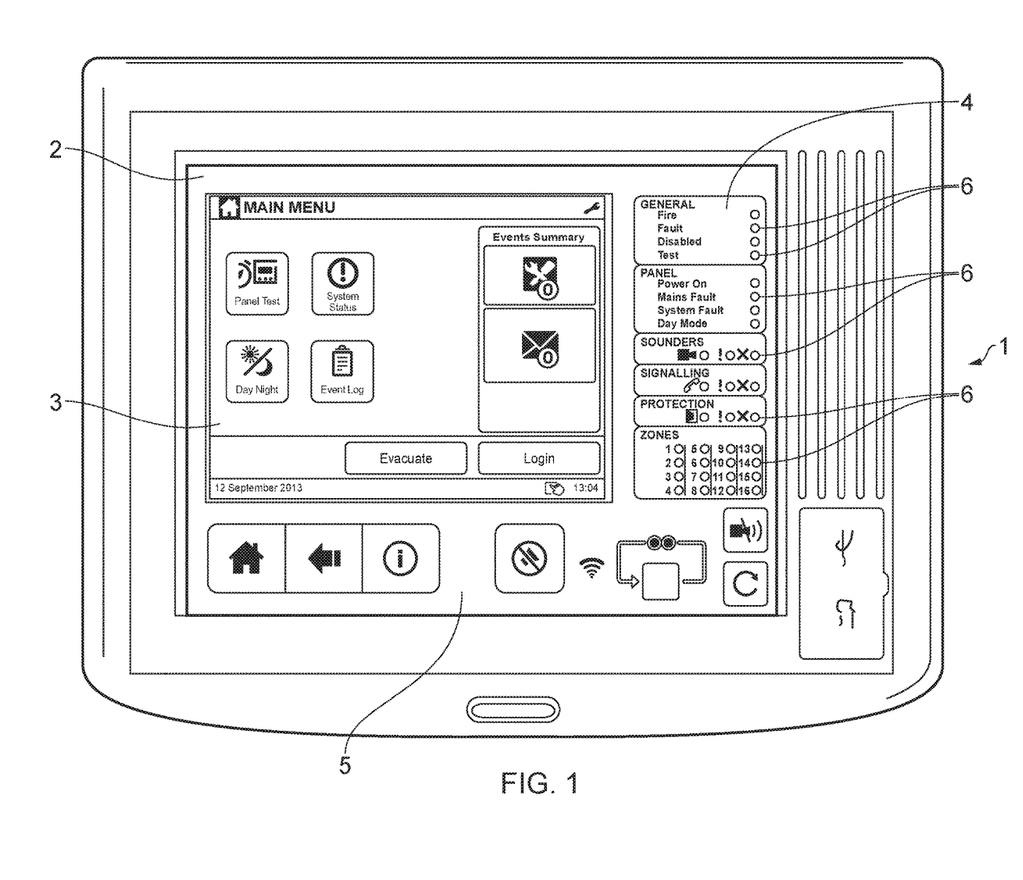
FIG. 1 is a view of a fire alarm panel according to the present invention.

Referring to FIG. 1, a fire alarm panel 1 is shown having a panel interface 2 which has three areas, a display screen 3, a condition LED area 4 and a fixed icon area 5. The display screen 3, condition LED area 4 and fixed icon area 5 are overlaid with a touchscreen panel which, in this embodiment, has the same extent as the panel interface 2. The touchscreen panel is, therefore, unlabelled since it has the same dimensions as the panel interface 2.

In this embodiment, the display screen 3 is an LCD 640×480 digits 18 bit RGB screen which is a dynamic display that can be altered to show a variety of different things. It is a graphical display screen. Of course, other LCD screens would also be appropriate. In other embodiments it could be a backlit LCD screen, an LED screen, an OLED screen or the like.

The condition LED area 4 is separate from the display screen 3 and includes a plurality of discrete condition LEDs 6 (only some of the LEDs are labeled in FIG. 1). Each condition LED 6 includes a label indicating what the LED represents. The condition LEDs are grouped into six sections, those six sections headed "General", "Panel", "Sounders", "Signaling", "Protection, and "Zones"". The General section has four condition LEDs labeled fire, fault, disabled and test. The Panel section includes four condition LEDs labeled power on, mains fault, system fault and day mode. The Sounders section includes three LEDs labeled with symbols indicating: activated, fault and disabled. The Signaling section includes three condition LEDs labeled with signals indicating: activated, fault and disabled. The Protection section includes three condition LEDs labeled with symbols indicating: activated, fault and disabled. The Zones section includes sixteen LEDs, each one representing a zone protected by the fire detection system and labeled with the number of that zone. Of course, in other embodiments fewer than or more than sixteen zone LEDs can be included.

An illuminated condition LED might indicate, for example, that there is a fault within a component or within a loop of components within a fire detection system, that there is a fire detected by a particular detector, that part of the fire detection system is disabled, or any of a number of other conditions.

During normal operation, where all detectors are functioning and no alarms are signaled, the condition LEDs will be illuminated against Panel: power on. If, however, there is a fault associated with a component, for example a detector in zone 11, the following condition LEDs will be illuminated: General: fault, Panel: power on; Signaling: fault. If the sounders in zone 5 have been placed in a test mode, for example, while they are being tested, the following LEDs will be illuminated: General: test, Panel: power on, Sounders: disabled, Protection: disabled. If a fire is detected by a detector in zone 3, not only will the fire detection system indicate this by emitting an alarm signal from the sounders, but the following LEDs will be illuminated: General: fire, Panel: power on, Sounders: activated, Zone: 3.

The fixed icon area 5 includes a number of icons graphically presented on the panel interface. The fixed icon area 5 is separate from the display screen 3 and from the condition LED area 4. Fixed icons within the fixed icon area 5 can include "home", "back", "help", "silence alarm", "reset" or any one of a number of other icons.

The touchscreen panel extends across the whole panel interface 2 and enables an operator to make selections on the panel interface 2 which cause some change. This change might be some change of setting or configuration of the fire alarm system that the fire alarm panel controls, or a change to the display screen 3 to display different information. In this embodiment, the touchscreen is a 4 wire resistive 8.4 inch touchscreen, but it could alternatively be a different size or specification of touchscreen panel. In other embodiments, the touchscreen panel could be a capacitive touchscreen, a surface acoustic wave touchscreen, infrared touchscreen or the like. Of course, the touchscreen does not have to have exactly the same dimensions as the panel interface 2.

The touchscreen panel is arranged such that, if an operator touches a point on it, a selection signal is generated by the touchscreen panel which is indicative of a selection. The use of the selection signal is described in more detail later.

Importantly in this invention, an operator can touch the touchscreen panel in the position of the condition LEDs or their labels in order to make a selection of the condition that the condition LED represents. The selection signal that is generated by the touchscreen panel is indicative of the thing that the condition LED represents. For example, if the operator touches the position of the condition LED or its label for zone 8, this will result in the selection of zone 8. This will be described in more detail later.

Figure 3:
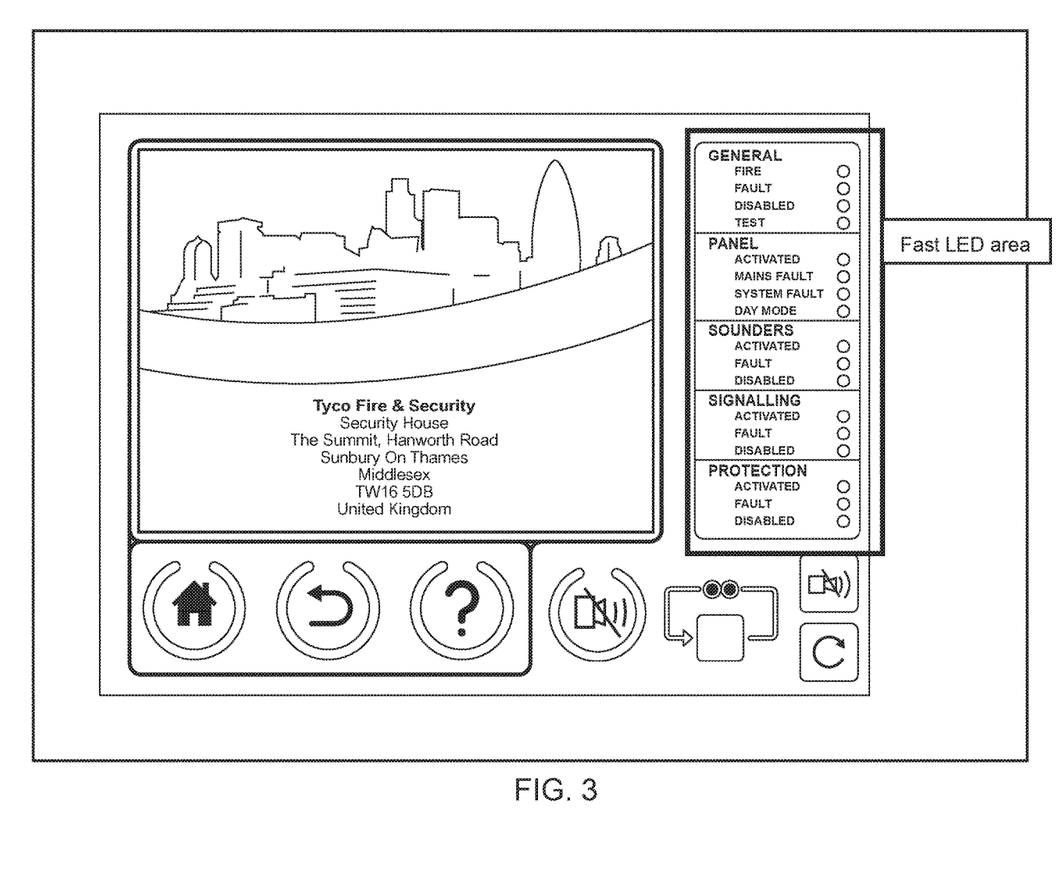
FIG. 3 is a view of another fire alarm panel according to the present invention displaying a default or home image with the fast LED area highlighted.
Figure 4:
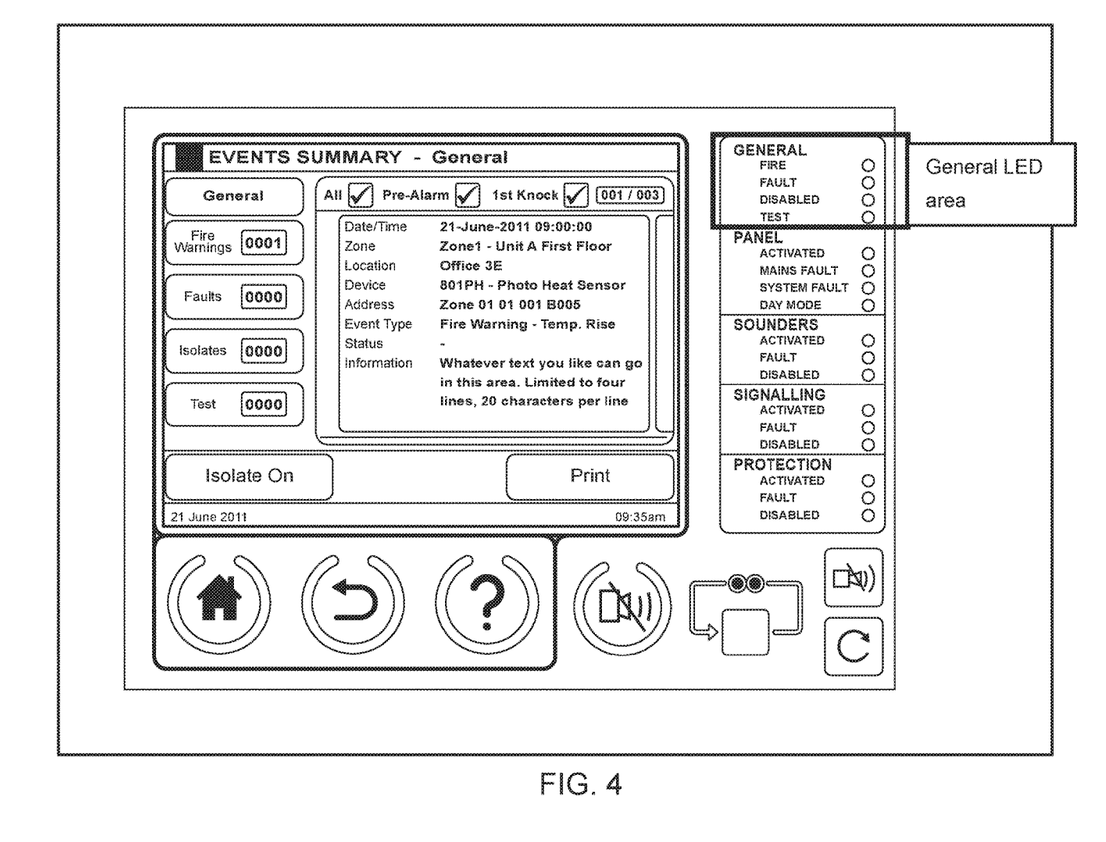
FIG. 4 is a view of the fire alarm panel shown in FIG. 3 displaying an events summary for the 'General' section.
Figure 5:
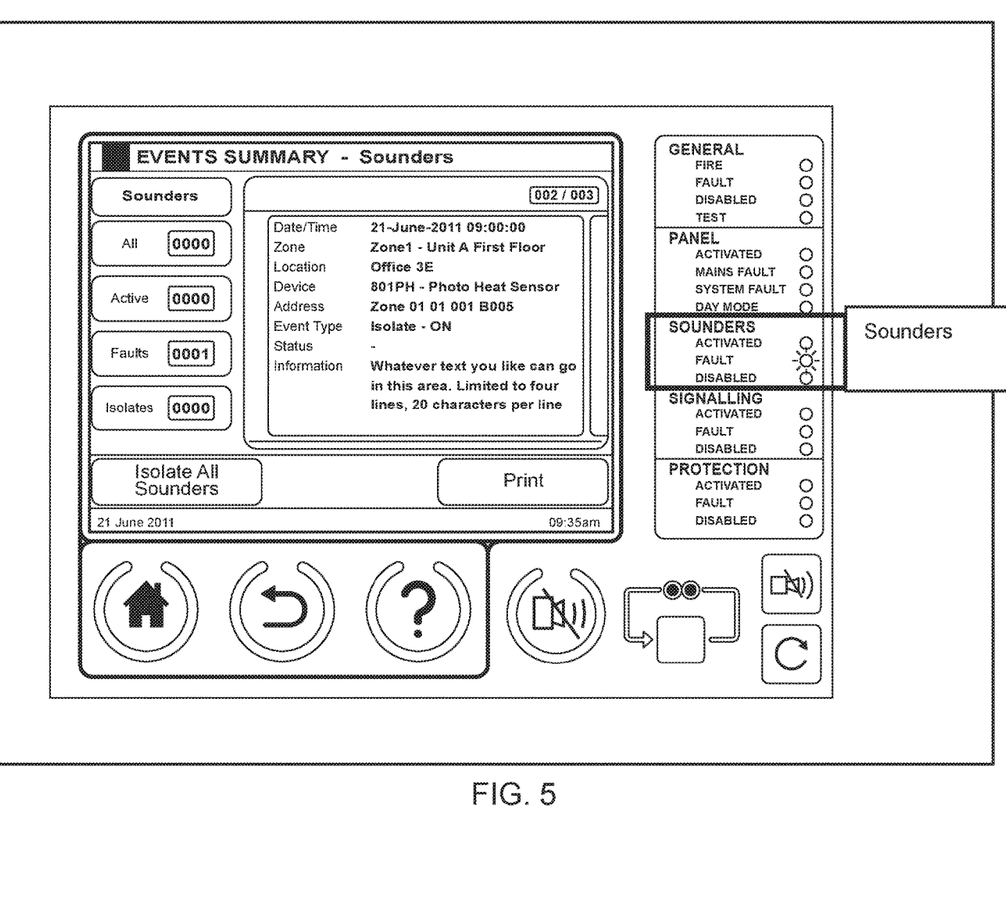
FIG. 5 is a view of the fire alarm panel shown in FIG. 3 displaying an events summary for 'sounders' and FIG. 6 is a view of a display screen of one of the fire alarm panels above displaying a map.

FIGS. 3, 4 and 5 show a fire alarm panel according to another embodiment. The most significant difference is that this other embodiment does not include zone condition LEDs.

Figure 2:
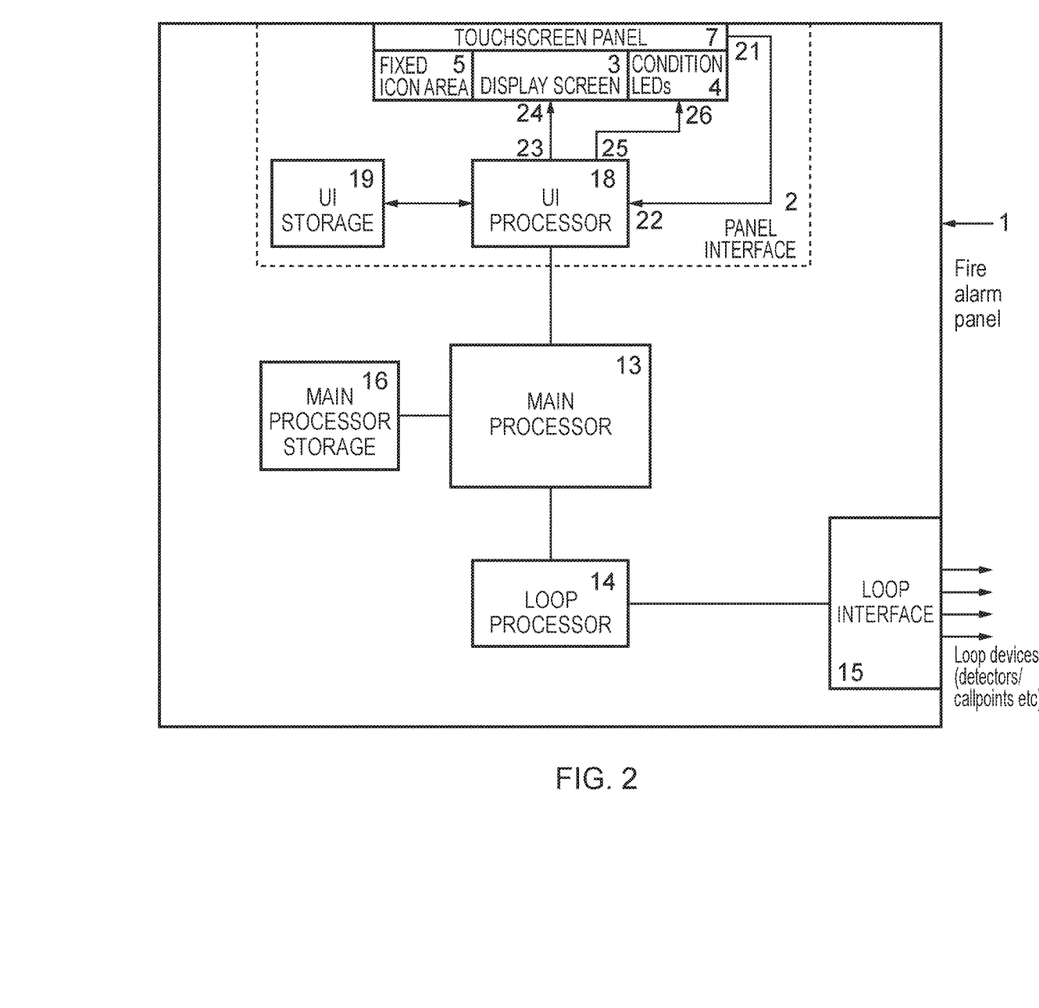
FIG. 2 is a block diagram showing a part of the fire alarm panel.

Referring now to FIG. 2, the fire alarm panel 1 will be described in more detail. The fire alarm panel 1 includes the panel interface 2, a main processor 13, a loop processor 14, a loop interface 15, and a main processor storage 16. The panel interface 2 includes the display screen 3, the condition LEDs area 4, the fixed icon area 5, the touchscreen panel 7, a user interface processor 18, and a user interface storage 19. The display screen 3, the condition LEDs area 4 and the fixed icon area 5 are arranged behind the touchscreen panel 7. The display screen 3, condition LED area 4, fixed icon area 5 and touchscreen panel 7 are connected to the user interface processor 18. The user interface processor 18 is also connected to the user interface storage 19 and to the main processor 13.

The central functionality of the fire detection system is operated by the main processor 13. Any signals emitted by a remote component, such as a fire detector, call point, sounder or the like is directed to the main processor 13 through the loop interface 15 and the loop processor 14.

Components are normally connected in loops from the loop interface 15 in a well known manner, although could be connected radially. The main processor storage 16 is connected to the main processor 13, and is present to store the configuration for the operation of the fire detection system, logs of activities on the fire detection system, results of testing procedures and the like.

The touchscreen panel 7 includes a selection signal output 21 by which the selection signal from the touchscreen panel 7 is conveyed to a selection signal input 22 of the UI processor 18. The UI processor 18 also includes a display signal output 23 which emits a display signal for driving the display screen 3, and the display screen 3 includes a display signal input 24 for receiving it. The UI processor 18 also includes a condition signal output 25 for transmitting a condition signal to the condition LED area 4, and the condition LED area 4 has a condition signal input 26 for receiving it. The UI processor 18, in this embodiment is an ARM 9 based processor.

It will be understood from the foregoing that the UI processor 18 sends the display signal to the display screen 3 so as to display information and the like relating to the fire detection system. The UI processor also sends a condition signal to the condition LED area 4 to cause it to illuminate certain of the condition LEDs 6 as appropriate. When an operator touches the touchscreen panel 7, the touchscreen panel 7 generates a selection signal indicative of the selection made by the operator on the touchscreen panel. This might be the selection of a condition LED 6 from within the condition LED area 4, an icon from the fixed icon area, or something from the display screen 3. This selection signal is conveyed to the UI processor which causes appropriate changes to be made. This will depend on the situation and the selection.

The UI processor 18 is connected to the UI storage 19 so that UI storage data may be passed between the two of them. The UI storage 19 is used to store at least some of the following: configuration and user preferences relating to the panel interface 2; images for displaying on the display screen; map images for displaying on the display screen; logs relating to the operation of the panel interface 2, such as a time stamped event log; firmware for operating the panel interface 2; product manuals and help information; and help and instructional videos. In this embodiment, the UI storage is an IC Flash NAND 128 MB mobile SM device.

Operation of the fire alarm panel 1 in so far as it relates to the panel interface 2 will now be described. During the normal operation of the fire detection system, the main processor 13 monitors the operation of a number of detectors and other components that are connected to the fire alarm panel 1 via the loop processor 14 and the loop interface 15. The display processor unit 11 would normally transmit a display signal to the display screen 3 of the panel interface 2 which is a default or 'home' screen which is then displayed, such as the screen displayed in FIG. 3. A library of images for display by the display screen 3 is stored in the UI storage 19 in a folder file structure, and the default screen is made up of one or more of the images from within the library. An operator can use the panel interface 2 by touching the touchscreen panel 7. If the operator touches the touchscreen panel 7 on one of the icons on the fixed icon area 5, the function associated with that fixed icon will be activated. For example, if the operator were to touch the touchscreen panel 7 in the region of the "help" icon (? or i), the touchscreen panel 7 will create a selection signal which is passed via the selection signal output 21 of the touchscreen panel 7 and the selection signal input 22 of the UI processor 18. The UI processor 18 can retrieve image data from the UI storage 19 which contains helpful information and transmits this as a display signal to the display screen 3 via the display signal output 23 and the display signal input 24 of the display screen 3.

The display screen 3 will often display areas which, by their shape or labeling indicate that they can be selected by the operator. Looking at FIG. 4, there are a number of selectable areas on the display screen including General, Fire Warnings, Faults, Isolates, Test, Isolate On, and Print. If the operator touches any of these selectable areas, the touchscreen panel 7 generates a selection signal which is conveyed to the UI processor 18 for appropriate operation according to the function of the selected area.

The operator can touch the location of a condition LED 6. In the example of FIG. 1, the operator might touch the position of the LED in the section "General" labeled "Fire". This causes the touchscreen panel 7 to transmit a selection signal to the UI processor 18 via the selection signal output 21 and the selection signal input 22, and the UI processor 18 retrieves image data from the UI storage 19 and sends the image data to the display screen 3 via the display signal output 23 and the display signal input 24 to display the Events Summary—General Screen, which is visible in the display screen 3 shown in FIG. 4. This feature is very significant because, if the UI processor 18 sends a condition signal to the condition LED area 4 via the condition signal output 25 and the condition signal input 26, one or more of the LEDs 6 will be illuminated and the operator is able to touch the touchscreen panel 7 in the region of the illuminated condition LED, and the appropriate information relating to that condition LED is placed on the display screen 3. Thus, with a single touch, the operator is able to view the cause of the condition LED being illuminated. In the event of a fire, this means that the operator can very quickly, with a single touch, access information concerning the fire condition simply by touching the illuminated condition LED which indicates the fire condition. This can save valuable minutes in identifying the location of the fire so that firefighters or rescue personnel can extinguish the fire or rescue anybody who might be trapped more quickly. Even if the condition is one which indicates the need for maintenance, a maintenance worker can identify the location and problem that is causing a condition LED to be illuminated by a single touch on the touchscreen panel. It should be appreciated that this is a significant improvement on what has been done before because it has, hitherto, been necessary to navigate menus and sub-menus to find this information in the event of a condition LED having been illuminated.

In another example, if a fault is detected with a sounder, the UI processor 18 causes the condition LED against sounders: fault to be illuminated. If an operator touches the illuminated LED, or the label associated with it, the display screen shown in FIG. 5 is displayed giving information on the sounders. The operator can, therefore, quickly identify the sounder which has a fault, and take the necessary action to repair it, replace it or isolate it.

Figure 6:
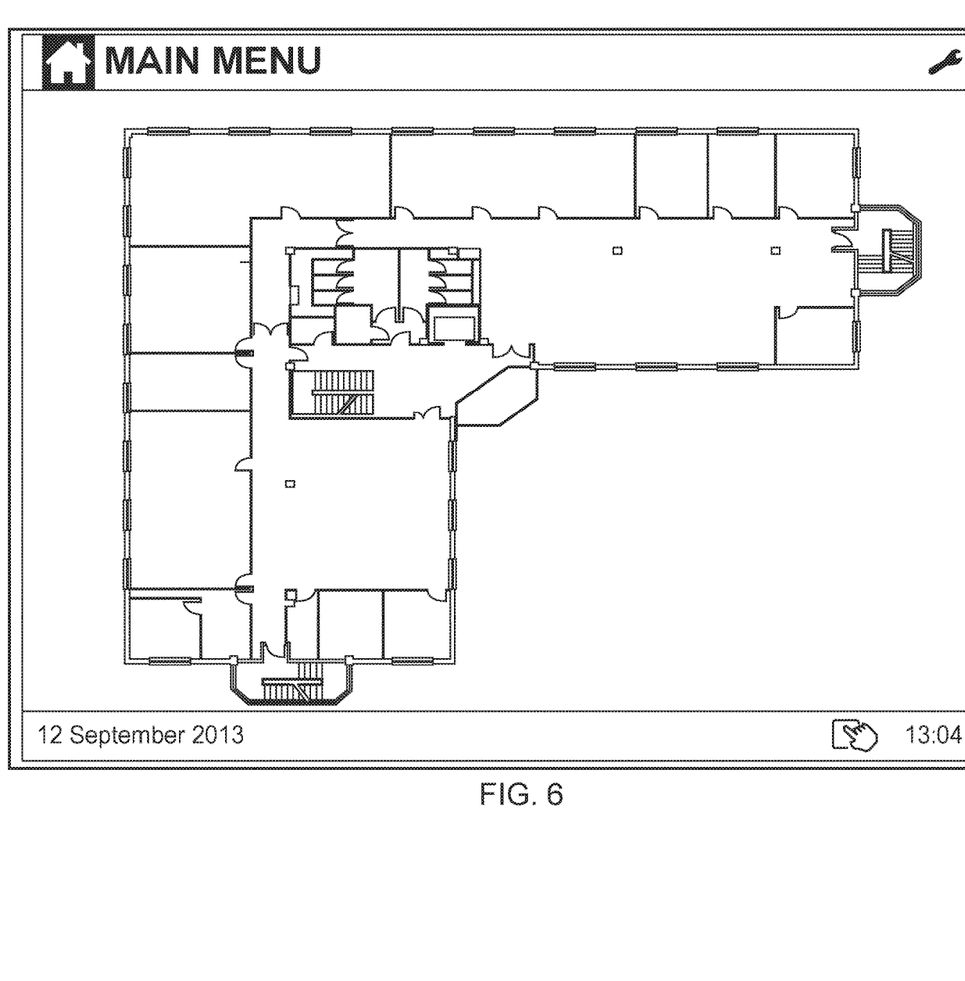

The condition LED area 4 of FIG. 1 includes a plurality of condition LEDs relating to different zones within a premises which is being protected by the fire protection system. For example, a factory building might be divided, for the purposes of the fire detection system, into a number of different zones, such as 1) Workshop A, 2) Workshop B, 3) Product Inspection, 4) Packaging, 5) Storage Warehouse, 6) Executive Suite. In each zone, a number of different fire detectors may be located. In this embodiment, a map of the premises and the position of the individual detectors within the premises and the zone concerned are stored in the form of a map or maps within the UI storage 19. The UI storage 19 includes a number of folders for storage of maps. Each folder is arranged to hold a map or maps of one particular zone. Normally, a single map of a zone will be sufficient, but if a zone is large or laid out in a complicated manner, more than one map might be appropriate, and the or each map can be stored in the folder relating to that zone. If a fire is detected by a detector in Zone 2) Workshop B, this will be identified by the main processor 13 which will cause the UI processor 18 to generate a condition signal which is sent to the condition LED area 4 to illuminate a condition LED associated with zone 2. It should be understood that other condition signals will also be received by the condition LED area 4 so that other condition LEDs within the condition LED area 4 are also illuminated. The operator can simply touch the illuminated LED for zone 2 "Workshop B" causing the touchscreen panel 7 to transmit a selection signal to the UI processor 18 which retrieves the map image from the UI storage 19 and transmits it to the display screen 3 as is shown in FIG. 6. This means that a map of the premises is displayed with the zone in which a fire alarm has been activated highlighted or alternatively, a map of the zone in which a fire has been detected is displayed. Firefighters and rescue personnel are then able to locate and find the source of the fire much more quickly than would previously have been the case, potentially saving lives and reducing damage. As an alternative to the above, when a condition LED is illuminated, the operator can touch the illuminated LED for Zone 2 "Workshop B", as above, causing the touchscreen panel 7 to transmit a selection signal to the UI processor 18 which retrieves an information screen from the UI storage 19 and transmits it to the display screen 3 to give the operator information on the condition. The operator can then touch the screen, for example on the information button, which transmits a selection signal to the UI processor 18 which retrieves the map image from the UI storage 19 and transmits it to the display screen 3, as shown in FIG. 6.

In another embodiment according to the third aspect of the invention referred to above, but not shown in the drawings, a fire alarm panel has a panel interface with three areas, a display screen, a condition LED area and a fixed icon area. The display screen, and the fixed icon area are overlaid with a touchscreen panel. The condition LED lies outside of the area overlaid by the touchscreen panel.

The condition LED area includes a plurality of discrete condition LEDs and each condition LED includes a label indicating what the LED represents. The condition LED area includes a button against each of the LEDs. The condition LEDs are grouped in the same way as is disclosed in the above embodiment, but rather than the selection of an LED being as a result of touching the touchscreen, the LED is selected by pressing the associated button. If a fire, a fault or some other condition is present in the system, appropriate LEDs will be illuminated in the same way as in the above embodiment.

The panel interface is part of a fire alarm panel which also includes a main processor, a loop processor, a loop interface and a main processor storage. The panel interface includes the display screen, the condition LED area, the fixed icon area, the touchscreen panel, the buttons, a user interface processor and a user interface storage 19 similar to that described above. The operator can touch the button associated with a condition LED, and the button will transmit a selection signal to the UI processor, and the UI processor retrieves image data from the UI storage and sends the image data to the display screen via a display signal output and a display signal input to display an image such as the Events Summary-General screen, like the one which is shown in FIG. 4. The condition LED area includes a plurality of condition LEDs relating to different zones within a premises which is being protected by the fire detection system. For example, a factory building might be divided, for the purposes of the fire detection system, into a number of different zones, such as 1) Workshop A, 2) Workshop B, 3) Product Inspection, 4) Packaging, 5) Storage Warehouse, 6) Executive Suite. In each zone, a number of different fire detectors may be located. In this embodiment, a map of the premises and the position of the individual detectors within the premises and the zone concerned are stored in the form of a map or maps within the UI storage.

If a fire is detected by a detector in Zone 2) Workshop B, this will be identified by the main processor which will cause the UI processor to generate a condition signal which is sent to the condition LED area to illuminate a condition LED associated with zone. It should be understood that other condition signals will also be received by the condition LED area so that other condition LEDs within the condition LED area 4 are also illuminated. The operator can simply touch the button associated with the illuminated LED for zone 2 "Workshop B" causing a selection signal to be transmitted to the UI processor which retrieves the map image from the UI storage and transmits it to the display screen as shown in FIG. 6. This means that a map of the premises is displayed with the zone in which the fire alarm has been activated highlighted or alternatively, a map of the zone in which the fire has been detected is displayed. Firefighters and rescue personnel are then able to locate and find the source of the fire much more quickly than would previously have been the case, potentially saving lives and reducing damage.

The invention claimed is:

1. A fire alarm system arranged to protect a plurality of protected zones of a premises, comprising a fire alarm panel with a panel interface, the panel interface including:
   a display screen;
   a plurality of discrete condition lights separate from the display screen, each of which represents one of the protected zones;
   a manual selection input associated with each of the plurality of condition lights; and
   a touchscreen panel extending across and forming a layer over both the display screen and the plurality of condition lights, wherein the touchscreen panel provides the manual selection inputs associated with the condition lights in a position of labels for the condition lights and selectable areas displayed on the display screen;
   wherein touching a manual selection input associated with one of the plurality of discrete condition lights causes the display screen to display a map of the protected premises showing on the map the location of the zone associated with a selected one of the discrete condition lights.

2. A fire alarm panel according to claim 1, wherein the panel interface further includes fixed icons separate from the display screen and separate from the condition lights but within the extent of the touchscreen panel.

3. A fire alarm panel according to claim 1, wherein the panel interface further comprises a user interface processor having a display signal output for directing a display signal to the display screen, and
   wherein the display screen includes a display signal input for receiving the display signal from the user interface processor.

4. A fire alarm panel according to claim 3, wherein the touchscreen panel includes a selection signal output for outputting a selection signal indicative of touches detected on the touchscreen panel, and wherein the user interface processor includes a selection signal input for receiving the selection signal from the touchscreen panel.

5. A fire alarm panel according to claim 3, wherein the panel interface further comprises a storage unit, the storage unit being connected to the user interface processor.

6. A fire alarm panel according to claim 5, wherein the storage unit includes at least one of: 1) a library of maps of the premises being protected; and 2) a library of images for displaying by the display screen.

7. A fire alarm panel according to claim 3 wherein the user interface processor includes a condition signal output, and the plurality of discrete condition lights includes a condition signal input, connected to the condition signal output for conveying a condition signal for controlling the plurality of discrete condition lights.

8. A method of operating a fire panel according to claim 1, comprising responding to the touching of the touchscreen panel in the region of a condition light by retrieving a map image relating to the condition light and displaying the map image on the display screen.

9. A method of operating a fire panel according to claim 8, further comprising retrieving a template image, and wherein displaying a map image includes displaying the template image on the display screen.

10. A fire alarm panel of a fire detection system arranged to protect a plurality of protected zones of a premises, the panel comprising:
   a graphical display screen;
   a plurality of discrete condition lights, each of which represents one of the protected zones;
   a manual selection input associated with each of the discrete condition lights;
   a user interface processor;
   a touchscreen panel extending across and forming a layer over both the display screen and the plurality of condition lights, wherein the touchscreen panel provides the manual selection inputs associated with the condition lights in a position of labels for the condition lights and selectable areas displayed on the display screen; and
   a storage unit containing image data,
   wherein the user interface processor includes an input for receiving a signal from each of the manual selection inputs from the touchscreen panel and a display output arranged to present the image data on the graphical display as a map of the protected premises showing on the map the location of the zone associated with the manually selected input.

11. A fire alarm panel according to claim 10, wherein storage unit includes a library of maps.

12. A method of a fire alarm system arranged to protect a plurality of protected zones of a premises, the fire system comprising a fire alarm panel with a panel interface and a display screen, the method comprising providing a plurality of discrete condition lights separate from the display screen, each of which represents one of the protected zones;
   detecting a manual selection input associated with each of the plurality of condition lights, and
   the screen displaying a map of protected premises showing on the map the location of the zone associated with a selected one of the discrete condition lights;
   wherein a touchscreen panel extends across and forms a layer over both the screen and the plurality of condition lights, wherein the touchscreen panel provides the manual selection inputs associated with the condition lights in a position of labels for the condition lights and selectable areas displayed on the display screen.

13. A fire alarm panel according to claim 1, wherein touching a manual selection input associated with one of the plurality of discrete condition lights indicates a selection of a condition that the discrete condition light represents.

14. A fire alarm panel according to claim 10, wherein touching a manual selection input associated with one of the plurality of discrete condition lights indicates a selection of a condition that the discrete condition light represents.

15. The method according to claim 12, further comprising indicating a selection of a condition that one of the plurality of discrete condition lights represents by touching a manual selection input associated with the discrete condition light.

16. A fire alarm panel according to claim 1, wherein every one of the condition lights is associated with a different one of the manual selection inputs that is against or forming a layer over the associated condition light and/or a label of the associated condition light.

17. A fire alarm panel according to claim 10, wherein every one of the condition lights is associated with a different one of the manual selection inputs that is against or forming a layer over the associated condition light and/or a label of the associated condition light.

18. The method according to claim 12, wherein every one of the condition lights is associated with a different one of the manual selection inputs that is against or forming a layer over the associated condition light and/or a label of the associated condition light.

\* \* \* \* \*